US009086956B2

(12) United States Patent
Kukulj

(10) Patent No.: US 9,086,956 B2
(45) Date of Patent: Jul. 21, 2015

(54) METHODS FOR INTERACTING WITH AN ON-SCREEN DOCUMENT

(75) Inventor: Dax Kukulj, Australian Capital Territory (AU)

(73) Assignee: Zetta Research and Development—RPO Series, Wilmington, DE (US)

( * ) Notice: Subject to any disclaimer, the term of this patent is extended or adjusted under 35 U.S.C. 154(b) by 93 days.

(21) Appl. No.: 13/698,824

(22) PCT Filed: May 23, 2011

(86) PCT No.: PCT/AU2011/000607
§ 371 (c)(1),
(2), (4) Date: Nov. 19, 2012

(87) PCT Pub. No.: WO2011/143720
PCT Pub. Date: Nov. 24, 2011

(65) Prior Publication Data
US 2013/0069915 A1 Mar. 21, 2013

Related U.S. Application Data

(60) Provisional application No. 61/346,975, filed on May 21, 2010.

(51) Int. Cl.
*G06F 3/041* (2006.01)
*G06F 15/02* (2006.01)
*G06F 3/023* (2006.01)
*G06F 17/24* (2006.01)
*G06F 3/0488* (2013.01)

(52) U.S. Cl.
CPC .......... *G06F 15/0291* (2013.01); *G06F 3/0236* (2013.01); *G06F 17/241* (2013.01); *G06F 17/242* (2013.01); *G06F 3/0488* (2013.01)

(58) Field of Classification Search
CPC . G06F 15/0291; G06F 17/241; G06F 3/0236; G06F 3/0488
USPC ......................................... 345/173
See application file for complete search history.

(56) References Cited

U.S. PATENT DOCUMENTS 3,478,220 A  11/1969  Milroy
5,608,745 A   3/1997  Hall et al.
(Continued)

FOREIGN PATENT DOCUMENTS

EP   0660157 A1  6/1995
WO  2010048679 A1  5/2010
WO  2011044640 A1  4/2011

OTHER PUBLICATIONS

International Search Report received in International Application No. PCT/AU2011/000606 dated Aug. 5, 2011.

*Primary Examiner* — Viet Pham
(74) *Attorney, Agent, or Firm* — Mattingly & Malur, PC

(57) ABSTRACT

Methods and systems are provided for enabling a user to interact via touch input with a document displayed on an electronic device such as an electronic reader. The system determines a measure of the size or shape of a touch object, and accordingly associates input gestures with different actions. A user can therefore use finger touch input for page turns and stylus touch input for electronic inking operations, without having to toggle between modes. The associated actions can be modified with a second touch event, such as a thumb touch in a corner of the display area. Infrared touch systems are well suited to implementing the inventive methods in electronic readers because they do not require the presence of any high refractive index layers in front of the display.

20 Claims, 14 Drawing Sheets

(56) References Cited

U.S. PATENT DOCUMENTS

| | | |
|---|---|---|
| 5,914,709 A | 6/1999 | Graham et al. |
| 6,310,610 B1 * | 10/2001 | Beaton et al. ................ 345/173 |
| 6,943,779 B2 | 9/2005 | Satoh |
| 2002/0163648 A1 | 11/2002 | Degertekin et al. |
| 2006/0227120 A1 | 10/2006 | Eikman |
| 2008/0259053 A1 * | 10/2008 | Newton ........................ 345/175 |
| 2008/0278460 A1 * | 11/2008 | Arnett et al. .................. 345/175 |

* cited by examiner

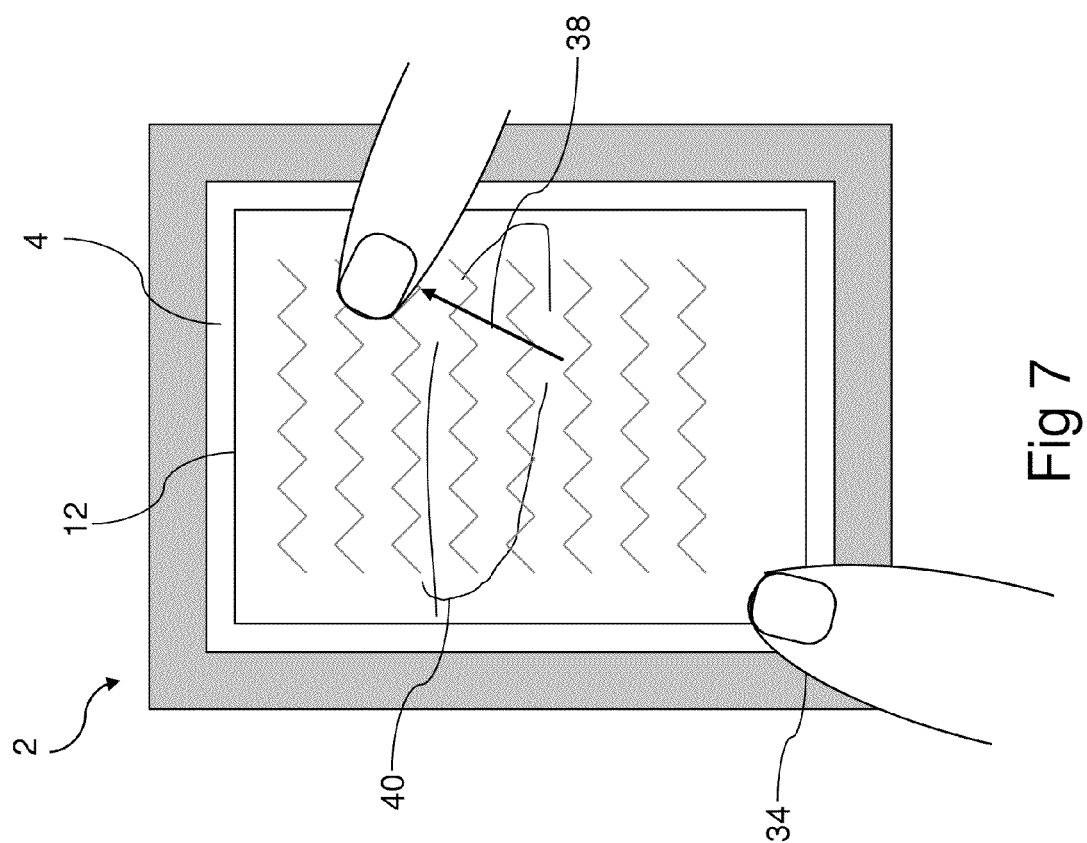

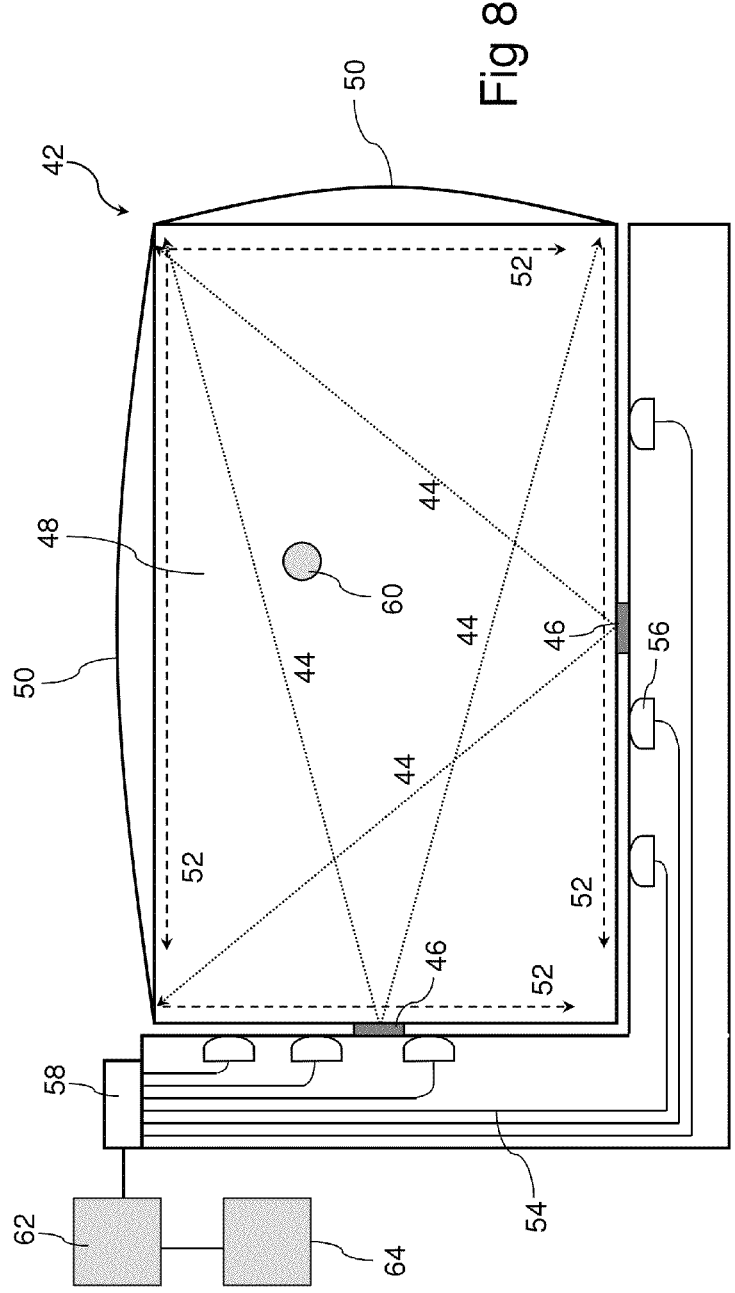
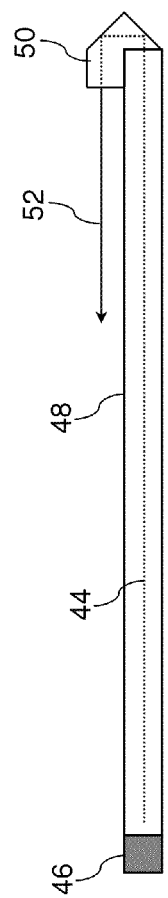

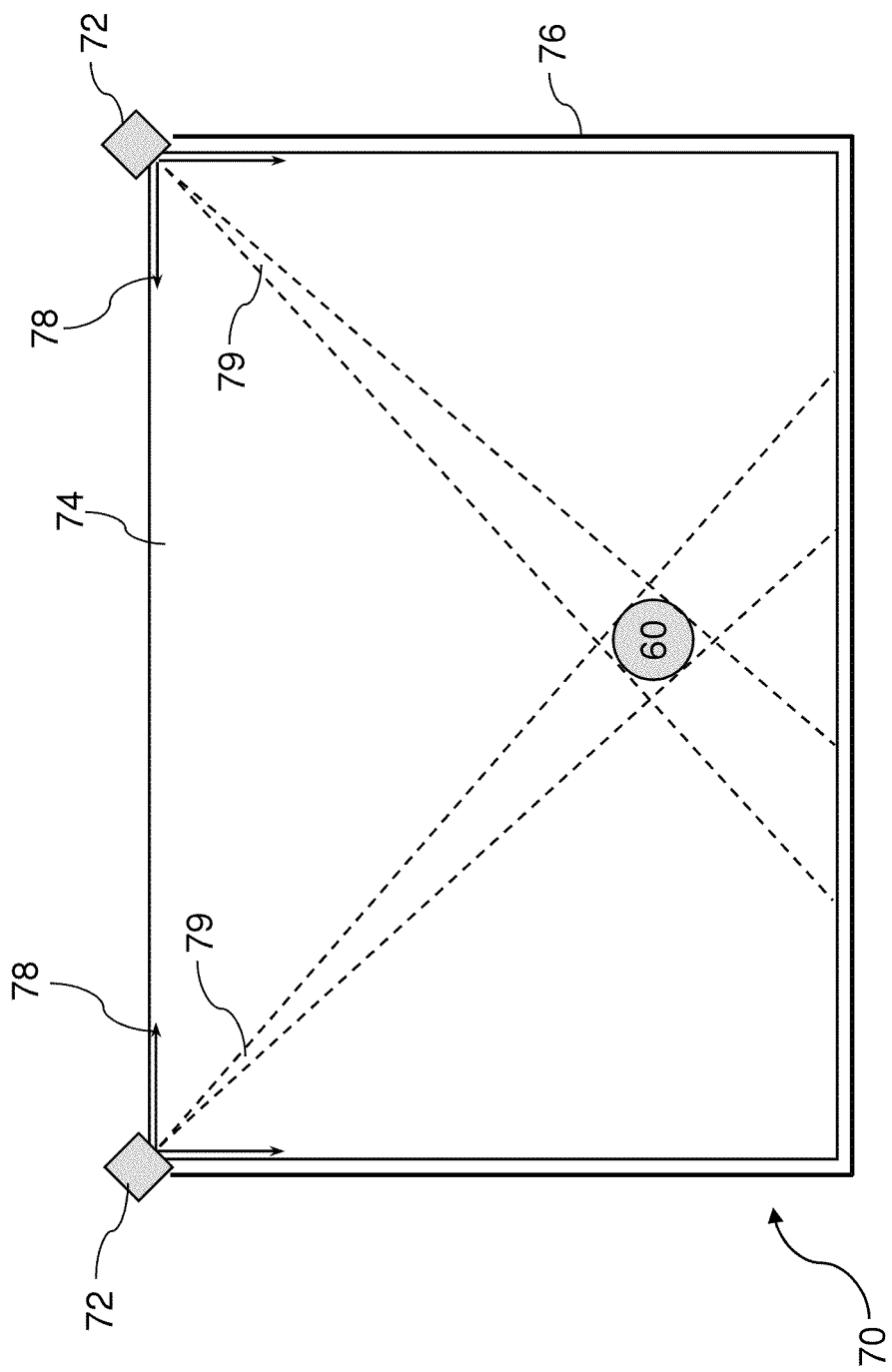

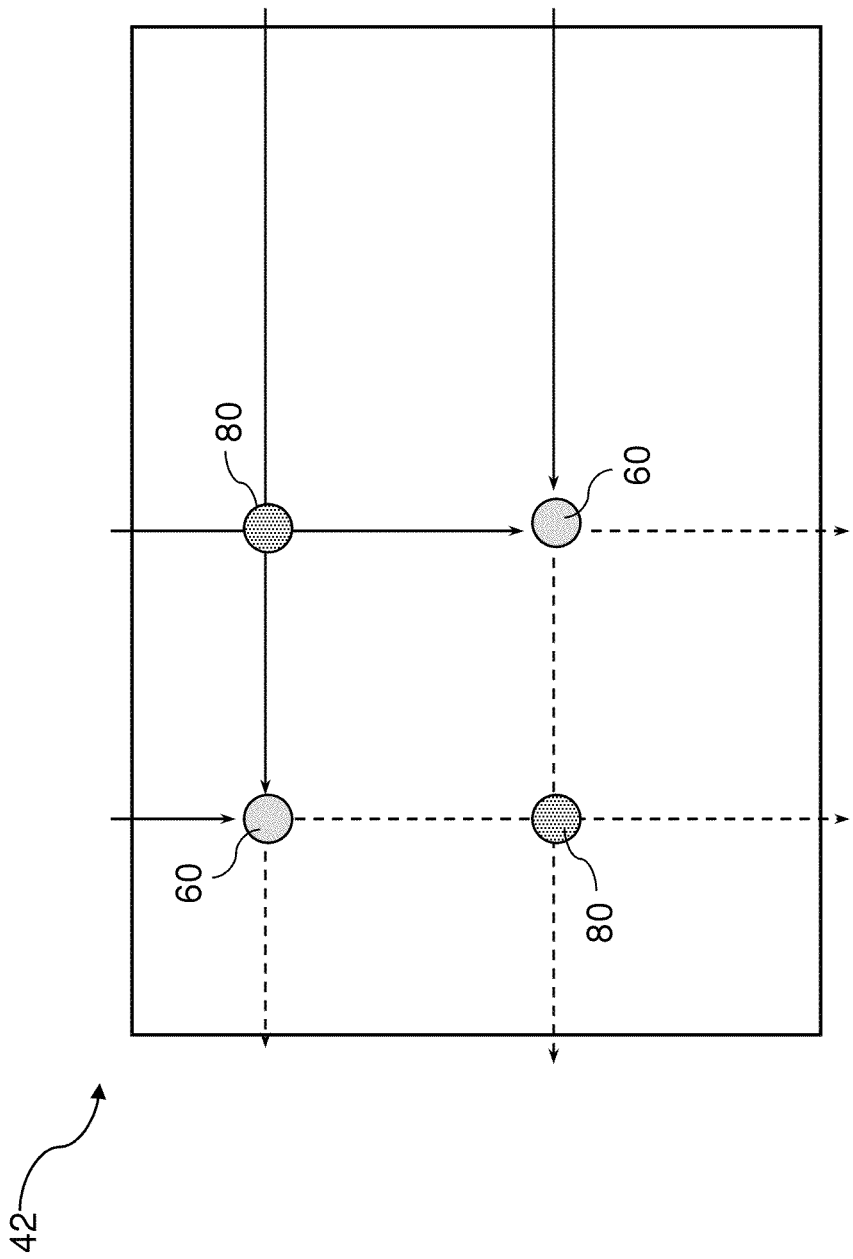

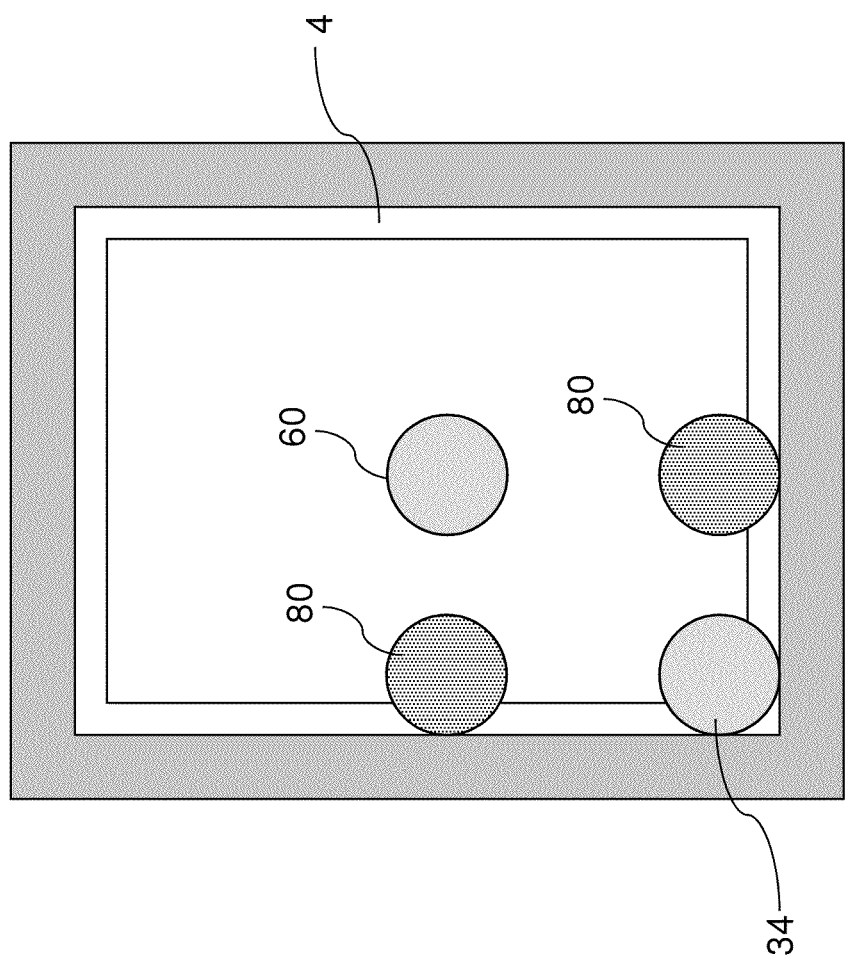

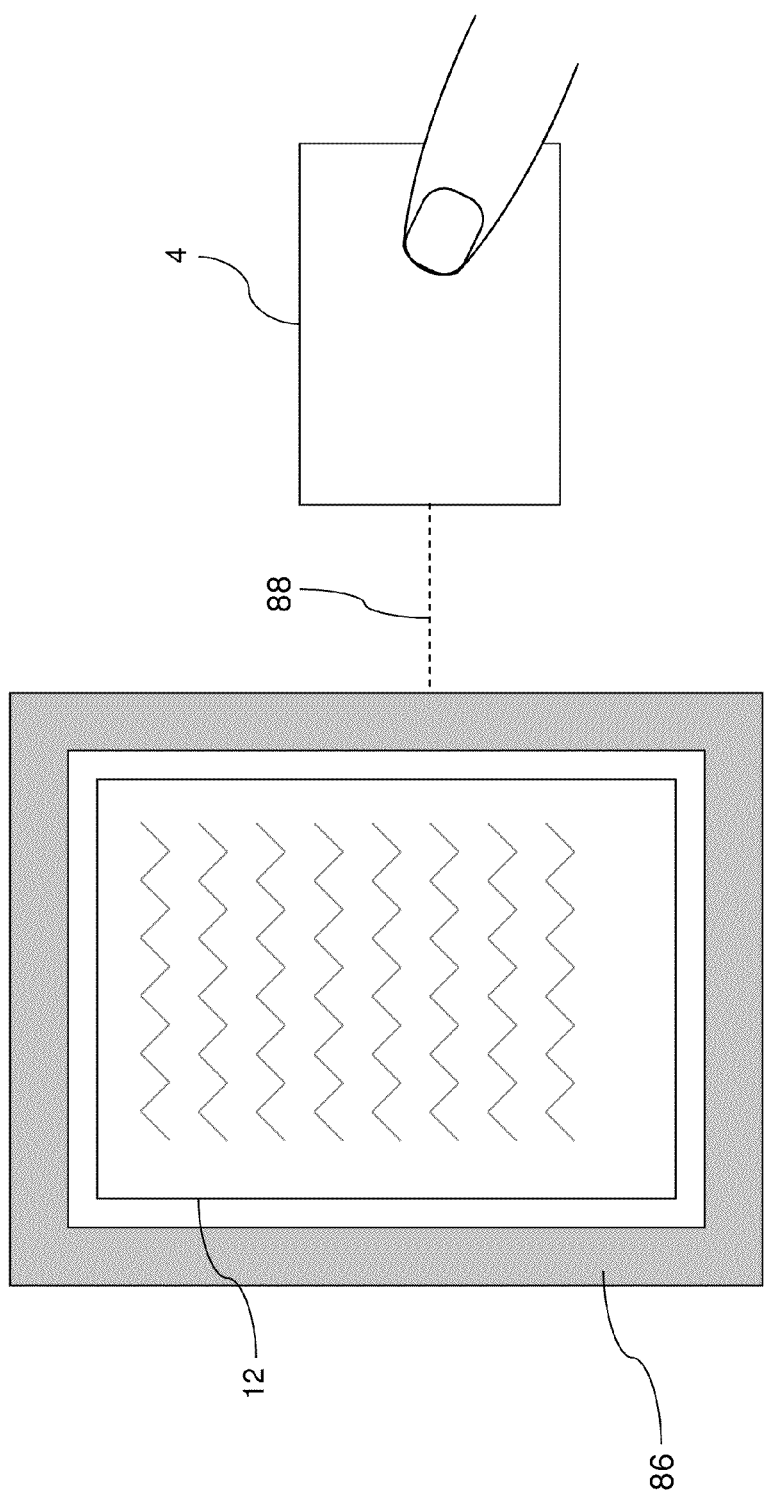

METHODS FOR INTERACTING WITH AN ON-SCREEN DOCUMENT

RELATED APPLICATIONS

The present application claims priority from U.S. provisional patent application No. 61/346,975, the contents of which are incorporated herein by reference.

FIELD OF THE INVENTION

The present invention relates to methods for interacting with an on-screen document. The invention has been developed primarily to enhance user interaction with a touch-enabled electronic reader, and will be described hereinafter with reference to this application. However it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Electronic readers, also known as e-readers or e-books, are becoming an increasingly common alternative to traditional books and other publications. Electronic readers typically comprise a reflective display that presents to a viewer pages from a publication held in the memory of the electronic reader, but it will be appreciated that any type of transmissive or emissive display could be used. Known reflective displays include electrophoretic (or 'electronic ink'), MEMS and electrowetting technologies. Some electronic readers currently available have a touch screen interface that enables a user to turn pages with a finger swipe instead of pressing a physical button. However on current touch-equipped devices the touch screen is of a resistive or capacitive type, meaning that there is at least one conductive layer interposed between the display and a viewer. These conductive layers are typically composed of indium tin oxide (ITO), which has a refractive index of approximately 2.0, substantially different from that of the glass or plastic e-reader display (approximately 1.4 to 1.6). This refractive index differential causes glare, and furthermore the ITO films are only partially transparent, typically absorbing 20 to 30% of visible light; both these factors degrade the viewability of the display, particularly since reflective displays are generally not backlit for reduced power consumption i.e. extended battery life. Some electronic readers use an inductive touch sensor (e.g. from Wacom Co, Ltd) located behind the display to avoid the use of overlays, however these sensors require the use of a special inductive pen and cannot readily detect finger touch.

Besides the page turn function, touch screen-equipped e-readers often provide a separate 'annotation' mode that the user can enter, for example to make notes on the e-book page. However the user then has to leave the annotation mode to return to the default page turn mode, so that a user may constantly have to switch between modes.

OBJECT OF THE INVENTION

It is an object of the present invention to overcome or ameliorate at least one of the disadvantages of the prior art, or to provide a useful alternative. It is an object of the invention in its preferred form to provide a touch screen electronic reader interface on which a user can both turn pages and make annotations without having to switch modes.

SUMMARY OF THE INVENTION

According to a first aspect of the invention there is provided a method for interpreting a user interaction with a document displayed on or by a device operatively associated with a touch screen, said method comprising the steps of:

(a) detecting a contact of an object on said touch screen;

(b) determining a parameter indicative of the size or shape of said object;

(c) performing a comparison between said parameter and a predetermined threshold; and (d) utilising said comparison to associate motion of said object across said touch screen with an action to be performed on said document.

Preferably, the motion is associated with a translation action on the document when the parameter is greater than or equal to the threshold, or alternatively with an annotation action on the document when the parameter is less than the threshold. The translation action is preferably a page turn when the motion is a substantially horizontal swipe.

The annotation action preferably comprises electronic inking on the document. Alternatively, the annotation comprises highlighting text in the document when a contact of a second object is detected in a predetermined portion of the touch screen. Preferably, the predetermined portion comprises areas proximate to the corners of the touch screen. In preferred forms of the invention, a parameter indicative of the size of the second object is required to be greater than or equal to the threshold.

In an alternative form of the invention, the motion is associated with an erasure action of annotation on the document when the parameter is greater than or equal to the threshold, and when a contact of a second object is detected in a predetermined portion of the touch screen. Preferably, the predetermined portion comprises areas proximate to one or more corners of the touch screen. In preferred forms of the invention, a parameter indicative of the size of the second object is required to be greater than or equal to the threshold.

The threshold is preferably chosen to distinguish between contact of a finger or thumb on the touch screen and contact of a stylus on the touch screen.

Preferably, the device is an electronic reader. More preferably, the touch screen does not include any layers in front of the display surface of the electronic reader with refractive index substantially different from the refractive index of the front layer of the display. In preferred forms of the invention the touch screen is an infrared touch screen.

According to a second aspect of the invention there is provided a method for facilitating user interaction with a document using a touch-sensitive device, said method comprising the steps of:

(a) determining size or shape of a touch object in contact with said touch-sensitive device;

(b) providing a series of protocols associated with a respective series of values or ranges of values of said size or shape of said touch object to manipulate said document; and (c) initiating at least one of said respective protocols upon motion of said touch object relative to said device.

According to a third aspect of the invention there is provided a touch-sensitive device comprising:

a display;

a touch screen operatively associated with said display;

a detector for detecting contact of an object on said touch screen and for tracking motion of said object across said touch screen;

a processor for determining a parameter indicative of the size or shape of said object and for performing a comparison between said parameter and a predetermined threshold; and a controller for utilising said comparison to associate motion of said object across said touch screen with an action to be performed on a document displayed on or by said display.

Preferably, the display is a reflective display integrated with the touch screen. More preferably, the touch screen does not include any layers in front of the display surface of the reflective display with refractive index substantially different from the refractive index of the front layer of the display. The touch screen is preferably an infrared touch screen.

According to a fourth aspect of the invention there is provided an article of manufacture comprising a computer usable medium having a computer readable program code configured to conduct the method of the first or second aspects of the invention, or to operate the touch-sensitive device of the third aspect of the invention.

BRIEF DESCRIPTION OF THE DRAWINGS

Preferred embodiments of the invention will now be described, by way of example only, with reference to the accompanying drawings in which:

FIG. 7 illustrates a finger swipe action modified by a second touch event;

FIG. 8 shows a plan view of an infrared touch screen suitable for use in a touch-equipped electronic reader;

FIG. 9 illustrates in side view a light path through selected components of the infrared touch screen shown in FIG. 8;

FIG. 11 shows a plan view of an optical touch screen;

FIG. 12A shows the occurrence of a double touch ambiguity with an infrared touch screen;

FIG. 14 shows how the controller of an infrared touch screen can use knowledge of an expected touch location to resolve a double touch ambiguity; and FIGS. 15, 16A and 16B show schematics of apparatus suitable for performing the inventive methods.

DETAILED DESCRIPTION OF PREFERRED EMBODIMENTS OF THE INVENTION

Figure 1:
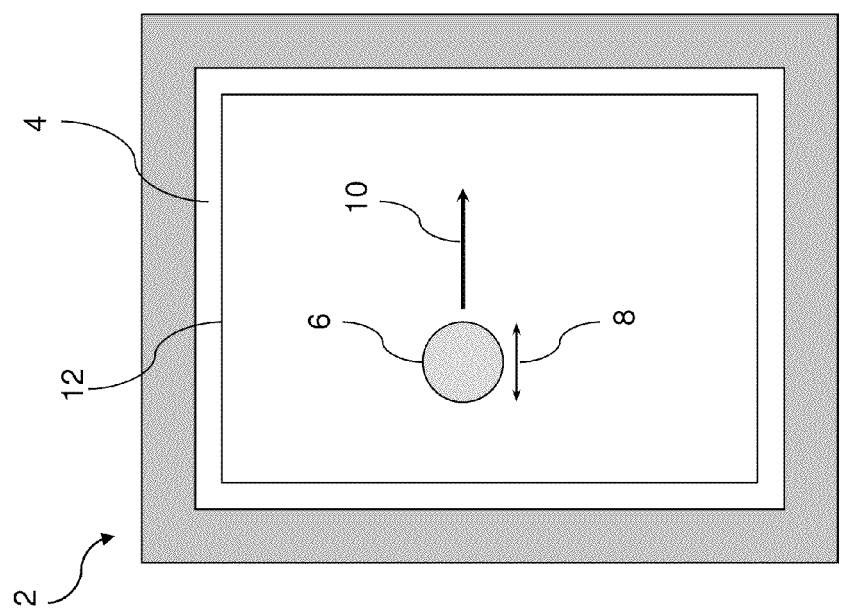
FIG. 1 shows a plan view of a touch-enabled electronic reader.

FIG. 1 shows in plan view an electronic reader 2 with a touch-enabled display area 4 (i.e. a touch screen) that can sense contact of an object 6, determine a parameter 8 indicative of the size or shape of the object, and track motion 10 of the object across the touch screen. In the example shown in FIG. 1 the parameter is a size-related parameter in the form of a measure of a width of the object, but alternatively the parameter may be in the form of a measure of the area of the object, or it may be a shape-related parameter such as a ratio of width measures in two axes. Those skilled in the art will appreciate that with some types of touch screen (e.g. infrared or surface acoustic wave) it is convenient to measure a width of a touch object based on the number of energy paths occluded, while with other types of touch screen (e.g. projected capacitive or in-cell optical) it is convenient to measure an area of a touch object based on the number of nodes with which the object interacts. An important aspect of the present invention is that the size- or shape-related parameter is used to aid interpretation of the object's motion 10, so as to associate that motion with an action to be performed on a document 12 displayed on the electronic reader. This concept can also be expressed in terms of facilitating user interaction with a document by initiating, based on size or shape of a touch object, one or more of a number of protocols for manipulating a document displayed on the electronic reader. The document may for example be a page of a publication stored in the memory of the electronic reader, such as an electronic book, newspaper or magazine. For the purposes of this specification the term 'document' also includes pictures, photographs, images, videos or anything that can be shown on the device display.

Once a size- or shape-related parameter of a touch object has been determined, the touch screen controller classifies the touch object by comparing the parameter with a predetermined threshold. In preferred embodiments the parameter is size-related. If a size-related parameter is greater than or equal to the threshold, the touch screen controller considers the touch object to be a finger or thumb, and if it is less than the threshold the controller considers the touch object to be a stylus. In embodiments where the size-related parameter is a width measure, the predetermined threshold may conveniently be in the range of 2 to 5 mm, while in embodiments where the parameter is an area measure the threshold may conveniently be in the range of 4 to 25 mm². In certain embodiments the predetermined threshold is user-definable, for example to allow for differently sized fingers (e.g. adult or child). In certain embodiments the device presents a set-up or configuration mode that allows a user to calibrate the size of their pointing finger.

In other embodiments the parameter is shape-related, and may for example be used to distinguish types of touch objects by comparing a metric of the symmetry of their touch profiles to a threshold value. For instance the parameter may be indicative of whether the contact is from the distal tip or ventral pad of the finger, since the distal tip is expected to have a more elliptical contact area. The symmetry metric and the threshold value may for example be based on a ratio of width measures determined in two axes, or on the ratio of major and minor axes of an ellipse fitted to an area measure. Hereinafter the invention will be described in terms of a size-related parameter.

Figure 2:
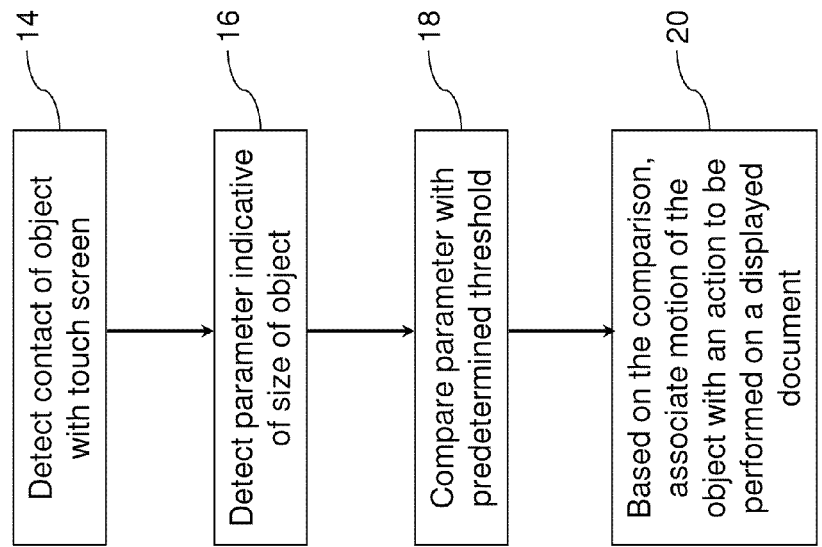
FIG. 2 shows a flow chart of a method according to one embodiment of the invention.

FIG. 2 shows a flow chart of a method according to an embodiment of the invention. In a first step 14 the touch screen detects contact of an object with the touch screen. We note that in most situations this contact will involve physical contact between the object and the surface of the touch screen. However some types of touch screen (e.g. infrared or in-cell optical) can also detect an object in close proximity to the touch screen surface, and for the purposes of this specification the term 'contact' encompasses both actual and near touch events. In a second step 16 a processor determines a parameter indicative of the size of the object, and in a third step 18 the processor performs a comparison between this size-related parameter and a predetermined threshold. Then in a fourth step 20 a controller utilises the comparison to associate motion of the object across the touch screen with an action to be performed on a document displayed on the electronic reader.

Figure 3:
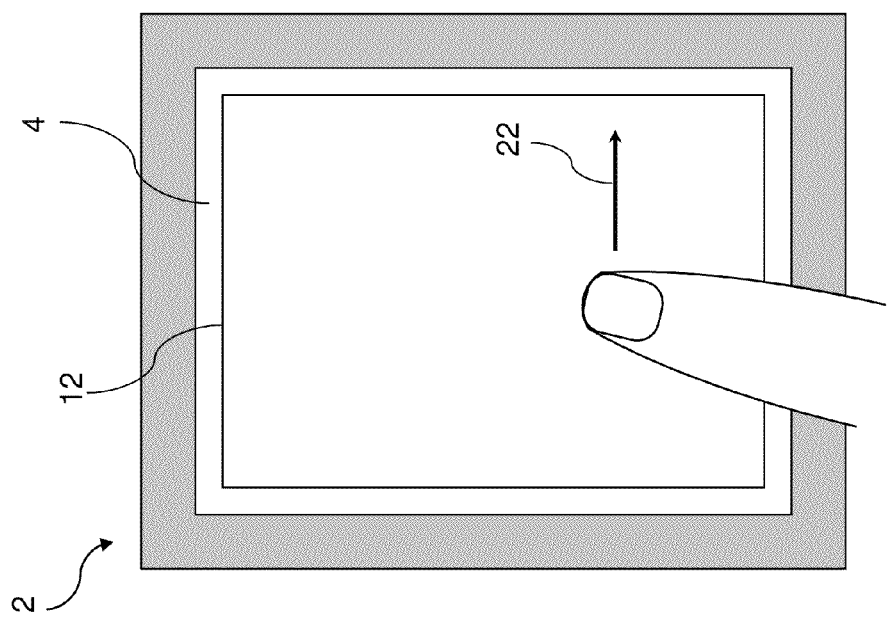
FIG. 3 illustrates a page turn gesture.

In a preferred embodiment the motion is associated with a translation action on the document if the comparison shows that the size-related parameter is greater than or equal to the threshold, and with an annotation action if the size-related parameter is less than the threshold. In one embodiment the translation action is a page turn when the motion is a substantially horizontal swipe. As shown in FIG. 3 this enables a viewer to use a horizontal finger swipe 22 to turn to the next page or the previous page of a multi-page document such as an e-book. In certain embodiments the particular association between the direction of the finger swipe and the direction of the resulting page turn can be a user-selectable feature. For example some users may prefer to associate a left swipe with turning to the next page and a right swipe with turning to the previous page, simulating the action of turning a paper page. Other users may prefer the reverse association, thinking of a right swipe as 'go forward' and a left swipe as 'go back'. Several other translation actions are possible. For example a short upwards or downwards swipe may be associated with turning to the beginning or end of a current e-book chapter, while a long upwards or downwards swipe may be associated with turning to the first or last page of an e-book. In one example embodiment the device controller will consider an upwards or downwards swipe to be 'short' if its extent is less than a quarter of the vertical extent of the displayed page, and 'long' if its extent is greater than or equal to that quantity. In other embodiments the short/long criterion is user-definable.

In other embodiments, applicable to situations where the document being displayed has only one page, motion of an 'above threshold' object is associated with a translation action on the entire document. For example this may be used to move the document to another part of the display area if the displayed document is smaller than the display area (e.g. a photograph). Alternatively if the document is larger than the display area (e.g. an engineering drawing), the motion may be used to move the document so that a different portion is displayed.

Figure 4:
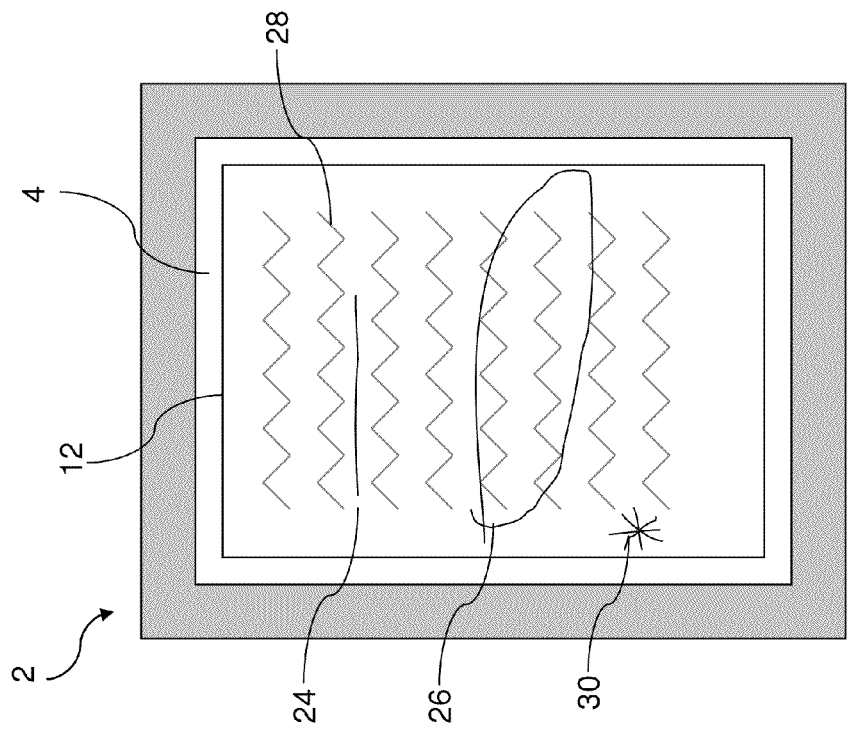
FIG. 4 illustrates various annotation actions that can be performed on a displayed page of a text document.
Figure 5:
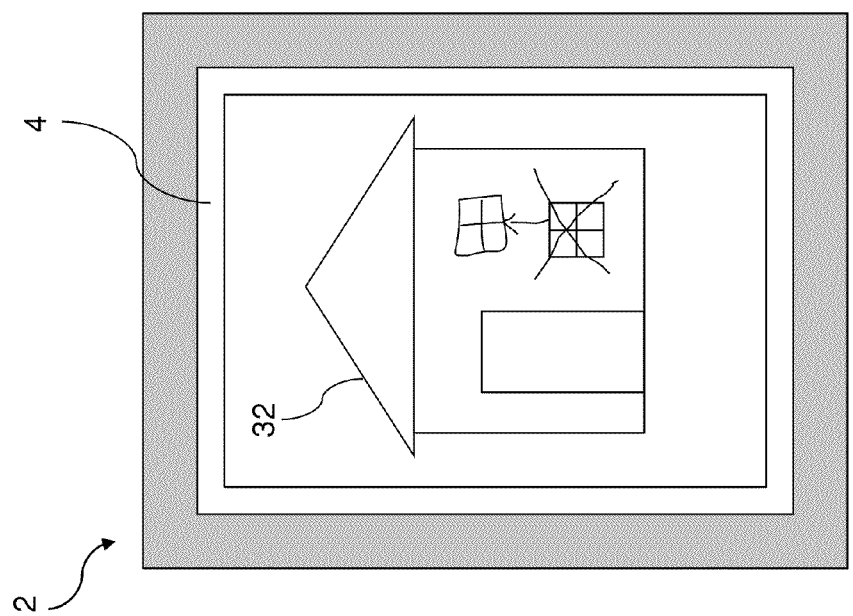
FIG. 5 illustrates an annotation action that can be performed on a displayed drawing.

Turning now to annotation actions, i.e. actions associated with motion of an object with size-related parameter less than the threshold, in preferred embodiments the annotation action comprises an 'electronic inking' operation such as drawing or writing on the displayed page of a document. As shown in FIG. 4, an electronic inking operation may for example be underlining 24 or circling 26 of portions of text 28 or writing notes 30 in the page margin. Alternatively, as shown in FIG. 5, the electronic inking operation may be a correction or alteration of a drawing 32.

In certain embodiments of the invention the annotations are automatically saved to memory. In some embodiments the user is provided with an 'erase all' action that erases all annotations made on the displayed page. Preferably the 'erase all' action is effected with a predefined gesture on the touch screen, such as a double tap. In certain embodiments this gesture can be performed anywhere on the touch area, while in other embodiments it has to be performed in a predetermined (and optionally user-definable) portion of the touch area, such as the lower right corner. In certain embodiments the device controller will only execute the 'erase all' action if the gesture is performed with a 'below size threshold' object, e.g. a stylus, while in other embodiments the device controller will only execute the 'erase all' action if the gesture is performed with an 'above size threshold' object, e.g. a finger. In yet other embodiments the 'erase all' action will be executed irrespective of the size of the object performing the appropriate gesture.

In other embodiments of the invention the annotations have to be actively saved, preferably with a predefined gesture on the touch screen such as a double tap as described above.

Figure 6:
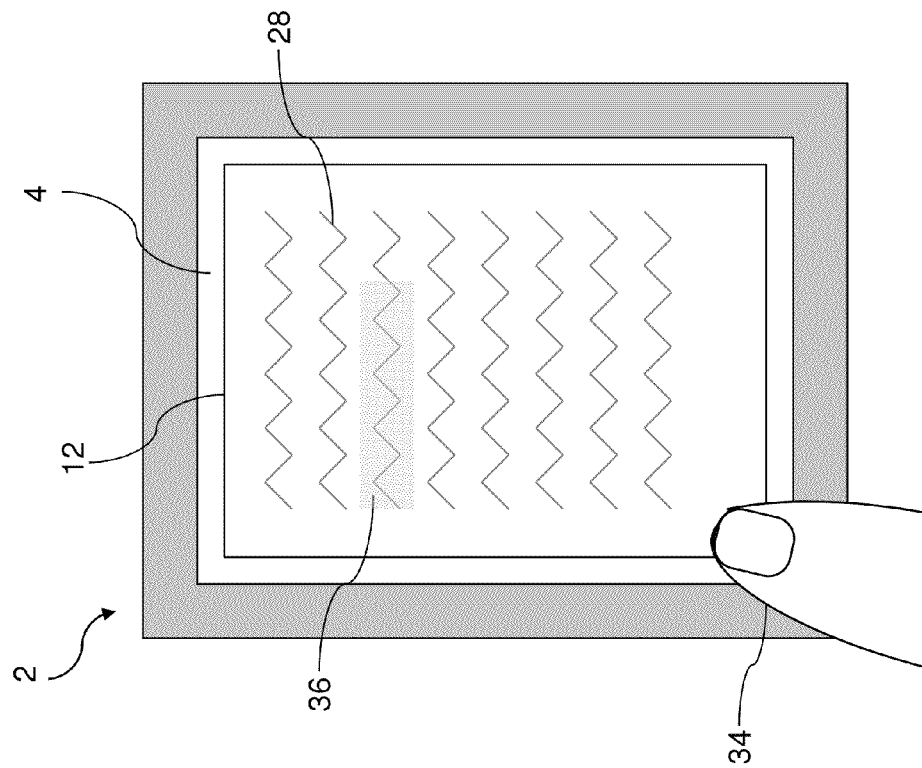
FIG. 6 illustrates an annotation action modified by a second touch event.

In preferred embodiments of the invention the number of available actions is expanded by the detection of a second touch event. For example motion of an object across the touch screen can be interpreted differently if a second touch event is performed on a predetermined portion of the touch area, such as the lower left or right corner or the left or right edge. This second touch event could be conveniently performed with the thumb of the hand holding the electronic reader, while the user uses their writing hand to interact with a displayed document. A right-handed user could naturally place their left thumb in the lower left corner or near the left edge of the touch area, and vice-versa for a left-handed user. In an embodiment shown in FIG. 6, a second touch event 34 modifies an annotation action such that motion of a 'below threshold' touch object highlights portions of text 36 instead of writing on the page as shown in FIG. 4. In an embodiment shown in FIG. 7, a second touch event 34 causes motion of an 'above threshold' object, such as a finger swipe 38, to be interpreted as an erase gesture that erases an existing annotation 40.

In preferred embodiments the second touch only modifies the interpretation of the primary object motion if the second touch is performed with an object with size parameter greater than or equal to the predetermined threshold.

In preferred embodiments the second touch event is required to be present during the primary object contact and motion events. It will be appreciated that this requires the touch screen to be able to detect and correctly determine the location of two simultaneous touch objects. If however the touch screen is of a type with no multi-touch capability, e.g. resistive touch, then the interpretation of an object motion could be modified by the detection of a second touch event occurring before contact of the primary object.

We turn now to the description of one specific touch system that can be used to implement the above-described methods. FIG. 8 shows in plan view an infrared touch screen 42 disclosed and described in detail in published US patent application No US 2008/0278460 A1 entitled 'Transmissive body' and incorporated herein by reference. Light 44, preferably in the near infrared region of the spectrum, from a pair of optical sources 46 such as LEDs is launched into a planar transmissive element 48 such as a glass sheet, within which it diverges in the in-plane direction until it encounters a pair of collimation/redirection elements 50 (such as parabolic turning mirrors) that collimate and redirect the light to produce two sheets of light 52 that propagate in front of the planar transmissive element. The light path through a transmissive element 48 and a collimation/redirection element 50 is shown in side view in FIG. 9. The light sheets are then collected by arrays of integrated optical waveguides 54 with associated in-plane lenses 56 and guided to one or more multi-element detectors 58 such as a digital camera chip or a line camera. It will be appreciated that an object 60 on or near the surface of the planar transmissive element will block or attenuate portions of the light sheets in each axis, allowing the object to be located and tracked by a device controller 62 that interrogates the detector(s). Generally the optical sources 46 will also be controlled by the device controller. FIG. 8 also shows a processor 64 operatively associated with the device controller, for processing the data obtained from the detector(s) using appropriate computer readable program code stored on a computer usable medium. This processing includes determining a size- or shape-related parameter of a touch object and performing a comparison between the parameter and a predetermined threshold.

For simplicity FIG. 8 only shows a few waveguides per axis, but in actual touch screens the in-plane lenses will generally be close-packed. The size of a touch object in each axis is determined from the number of lenses/waveguides that receive a diminished amount of light, and a touch screen with close-packed lenses on a 1 mm pitch for example is readily able to distinguish a stylus touch (with a dimension or size-related parameter of order 1 mm) from a finger touch (with a dimension or size-related parameter of order 10 mm).

Figure 10A:
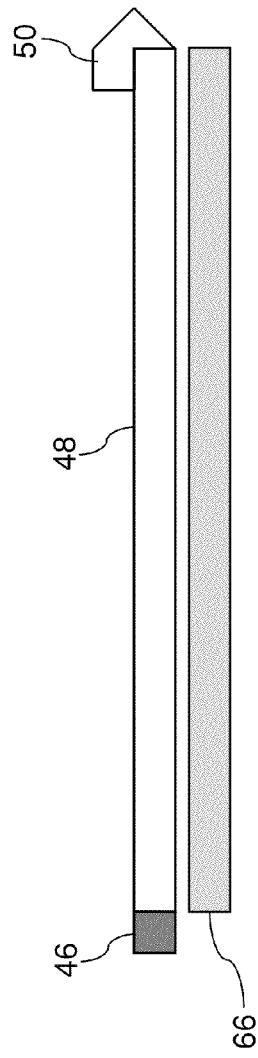
FIGS. 10A, 10B and 10C illustrate in side view various possible configurations for integrating the FIG. 8 touch screen with a display.
Figure 10B:
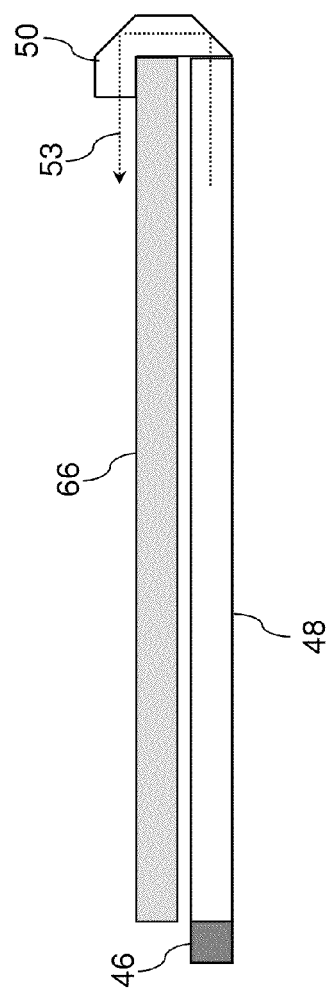
Figure 10C:
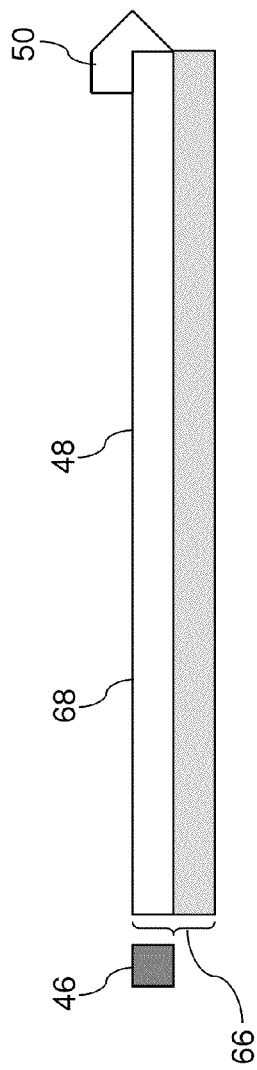

It will be appreciated that the touch-sensitive area of the touch screen 42 corresponds more or less to the area of the planar transmissive element 48. Consequently when the touch screen is incorporated into an electronic device such as an electronic reader 2 as shown in FIG. 1, the display area 4 will overlie the planar transmissive element (or a subset thereof) with the other touch screen components housed within the device casing. In certain embodiments the planar transmissive element 48 is located in front of the device display 66 as shown in side view in FIG. 10A. In other embodiments the planar transmissive element is located behind the device display as shown in FIG. 10B, with the collimation/redirection elements 50 being in an 'extended' form to fold the light path 53 around the display. In these two embodiments the planar transmissive element can be direct bonded or laminated to the display to minimise the number of air interfaces, reducing reflection losses. In yet other embodiments the cover layer 68 of the device display 66 serves as the planar transmissive element 48, as shown in FIG. 10C. It is important to note that in all of these embodiments the electronic device is provided with touch sensing functionality without introducing any high refractive index layers in front of the display. For superior screen viewability the embodiments shown in FIGS. 10B and 10C are preferred because there are no additional layers whatsoever in front of the display. However excellent screen viewability is also possible with the FIG. 10A embodiment provided the material of the planar transmissive element 48 is chosen to be highly transparent and index matched to the front layer of the display, which is not a demanding requirement.

The particular touch screen 42 illustrated in FIG. 8 is an example of a category of touch screens commonly known in the art as 'infrared' touch screens that detect a touch object via interruptions in two crossing (and usually perpendicular) fields of light. Several other forms of infrared touch screen will be known to those skilled in the art, including one described in U.S. Pat. No. 5,914,709 with optical waveguide arrays on both the 'transmit' and 'receive' sides as well as conventional 'discrete component' infrared touch screens described in U.S. Pat. No. 3,478,220 for example. In general, infrared touch screens will be suitable for implementing the methods of the present invention provided they have sufficient spatial resolution to distinguish a stylus touch from a finger touch.

Another type of touch screen suitable for implementing the methods of the present invention is the 'optical' touch screen, described for example in U.S. Pat. No. 6,943,779. As shown in plan view in FIG. 11, an 'optical' touch screen 70 typically comprises a pair of optical units 72 in adjacent corners of a rectangular input area 74 and a retro-reflective layer 76 along three edges of the input area. Each optical unit includes a light source for emitting a fan of light 78 across the input area and a multi-element detector (e.g. a line camera) where each detector element receives light reflected from a certain portion of the retro-reflective layer. A touch object 60 in the input area prevents light reaching one or more elements in each detector, and its location determined by triangulation. The size of the touch object can be inferred from the angles 79 subtended by the blocked light paths and the distances between the object and the optical units. It will be appreciated that optical touch screens and the various infrared touch screens described above can all be integrated with an e-reader without introducing any high index layers in front of the display.

Figure 12B:
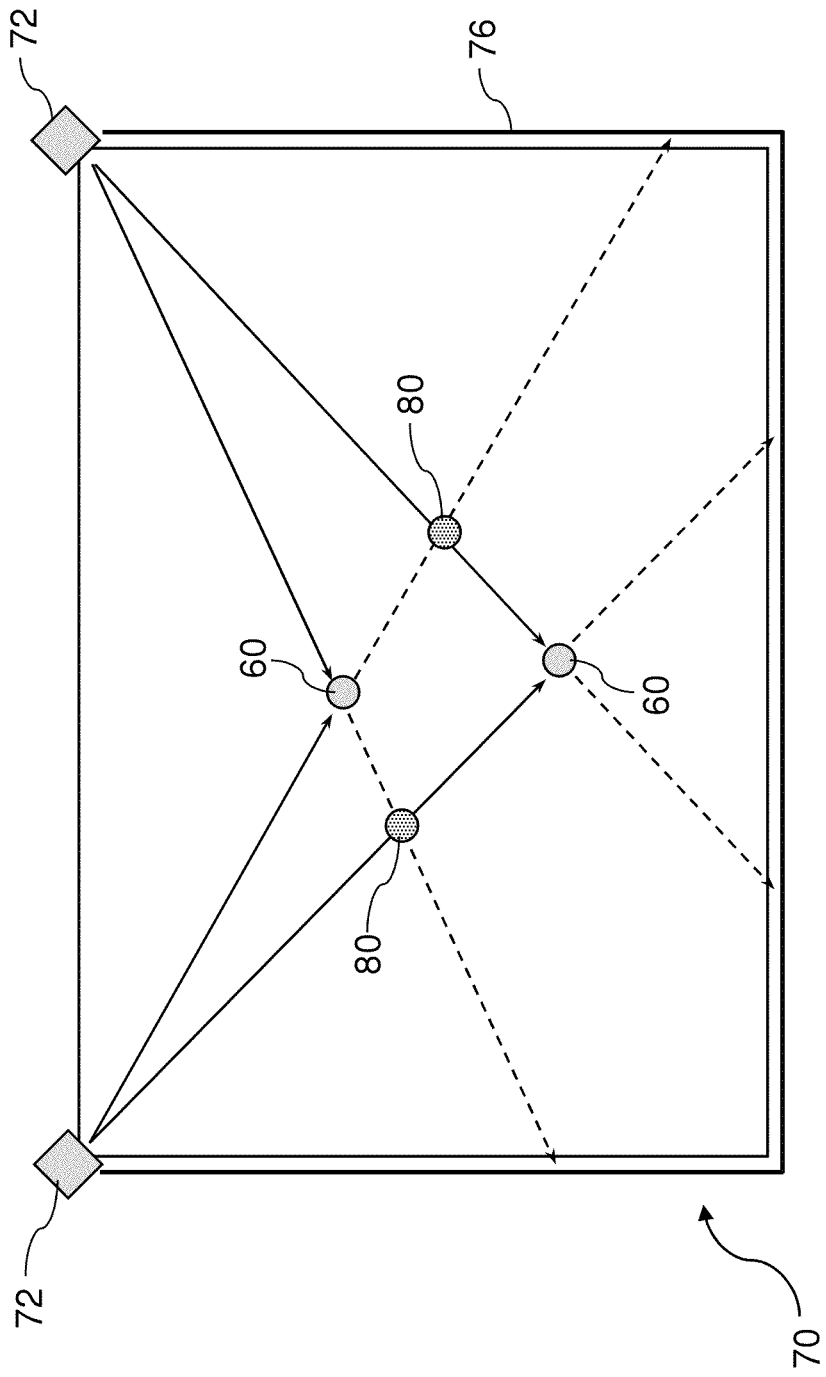
FIG. 12B shows the occurrence of a double touch ambiguity with an optical touch screen.
Figure 13:
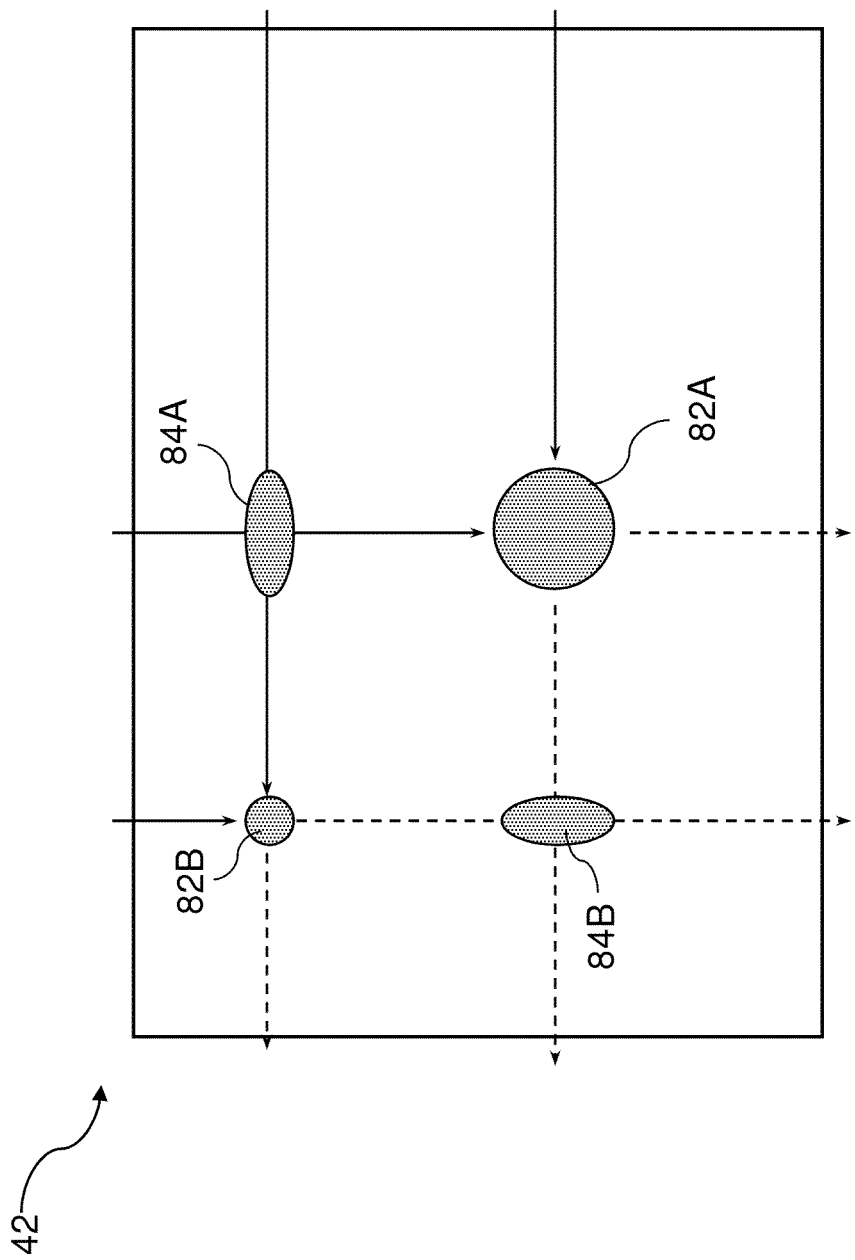
FIG. 13 shows how two simultaneous but differently-sized touch objects can appear to the controller of an infrared touch screen.

Those skilled in the art will know that infrared and optical touch screens are both prone to a 'double touch ambiguity' in situations where two touch events occur simultaneously. As shown in FIG. 12A for example, the controller of an infrared touch screen 42 may have difficulty in distinguishing the true locations of two touch objects 60 from the 'phantom' points 80. The corresponding ambiguity for an 'optical' touch screen 70 is shown in FIG. 12B. Fortunately however, there are several reasons why double touch ambiguity is unlikely to be a problem in the previously described embodiments where a second touch event modifies the interpretation of a gesture performed with a primary touch object. Firstly, referring back to FIGS. 6 and 7, it is highly likely that the second touch event 34, e.g. a thumb touch in one corner, will occur before contact of the primary touch object, similar to the situation where a 'shift' key is pressed before an alphanumeric key to modify its interpretation. A double touch ambiguity does not occur if the device controller detects one touch event before the other touch event occurs. Secondly there may be a significant size differential between the two touch objects, especially if a thumb touch is used to modify the interpretation of a gesture performed with a stylus. As illustrated in FIG. 13, if a large touch object and a small touch object are detected simultaneously, the device controller will typically be required to choose between a pair of approximately symmetrical touch points 82A, 82B and a pair of elongated touch points 84A, 84B. Since the touch signature of many objects (e.g. pens and fingers) will be approximately symmetrical (i.e. have a similar dimension in each axis), the device controller can be programmed to favour symmetrical touch points. Thirdly, the device controller can make use of the fact that the second (modifying) touch event 34 is expected to occur in the lower left or right corner of the display 4. As shown in FIG. 14, this information can be used to eliminate the 'phantom' points 80.

Many other 'software' methods, as well as hardware modifications, for mitigating the effects of double touch ambiguity and phantom points in infrared touch screens are known or under active development, including those disclosed in published PCT application No WO 2011/044640 A1; it will be easily recognised by those skilled in the art that these techniques may be used to enhance the operation of the present invention described herein.

Figure 16A:
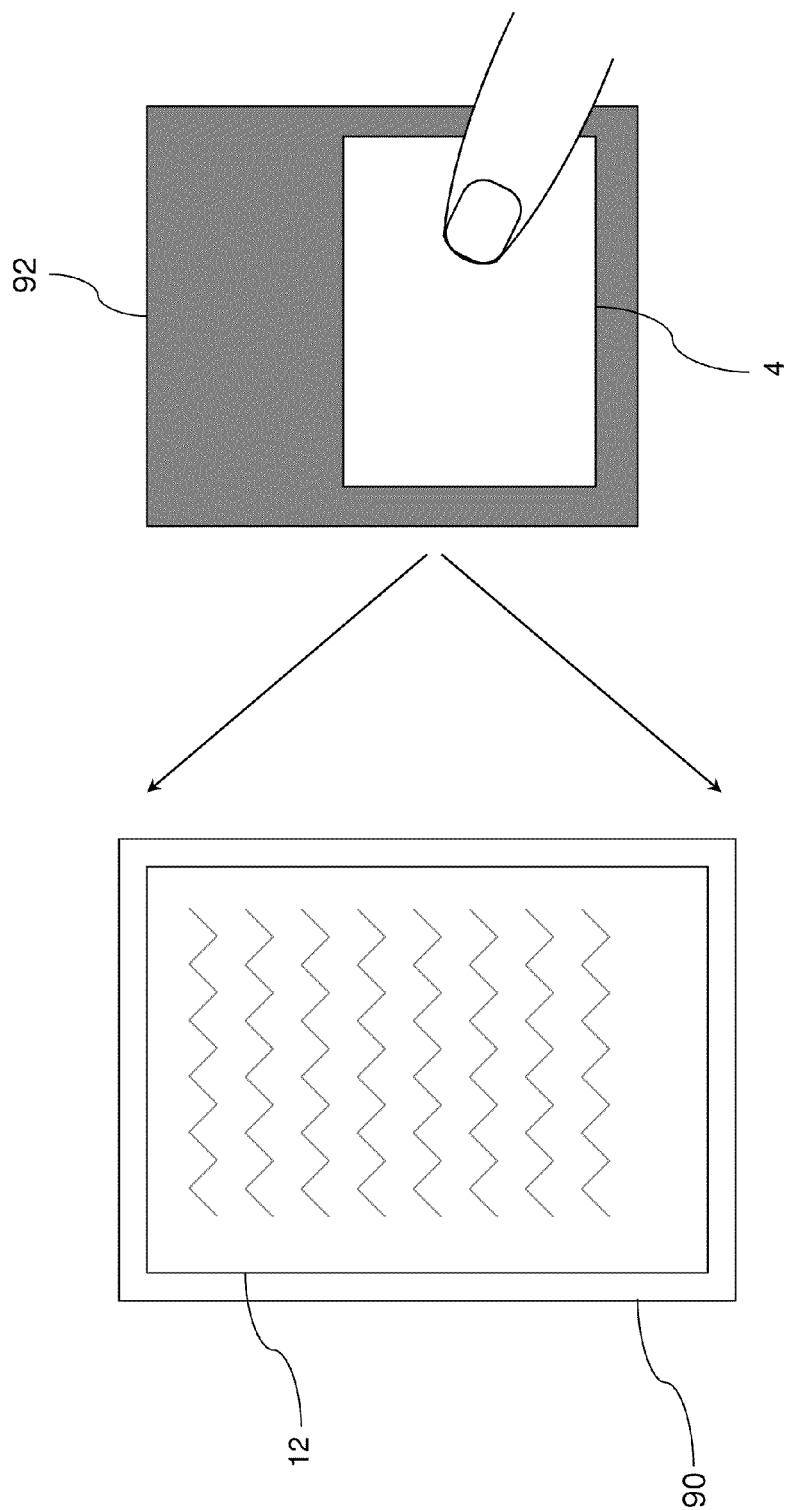
Figure 16B:
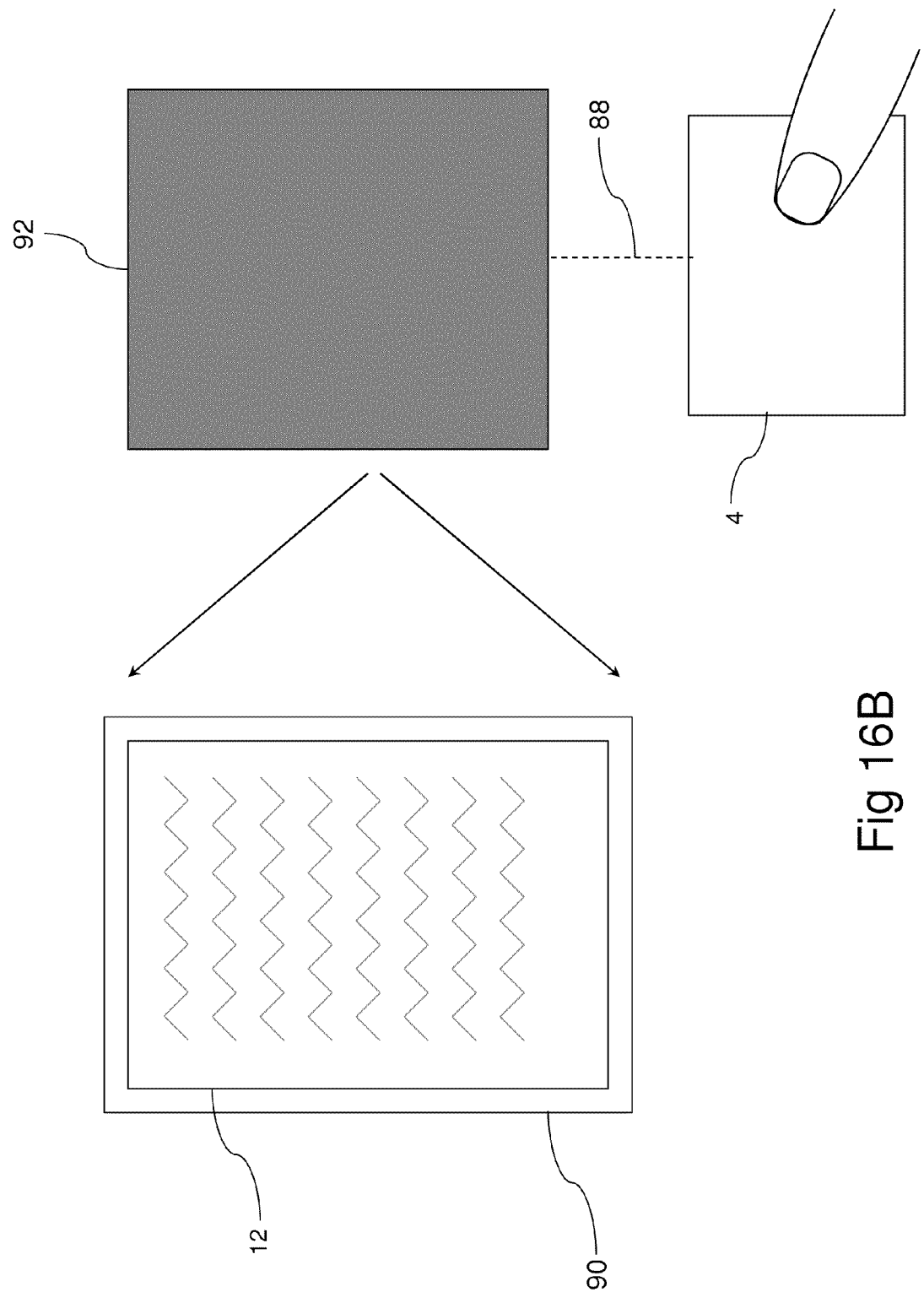

The methods of the present invention are also applicable to situations where a document is displayed on a device remote from the touch screen, or projected by a device onto a screen. For example as shown in FIG. 15 a user can interact with a document 12 shown on a separate display 86 (such as an electronic whiteboard) via touch input on a touch screen 4 operatively connected with the display by wire or wireless means 88. Alternatively as shown in FIG. 16A a user can interact with a document 12 projected onto a screen 90 by a projection device 92 via touch input on a touch screen portion 4 of the device; in yet another embodiment shown in FIG. 16B the touch input can be provided to a touch screen 4 remote from and operatively coupled to the projection device 92 by wire or wireless means 88. It will be appreciated that in the embodiments shown in FIGS. 15, 16A and 16B the touch screen 4 does not necessarily need to have a display function, and it is to be understood that the term 'touch screen' also encompasses this situation.

Although the invention has been described with reference to specific examples, it will be appreciated by those skilled in the art that the invention may be embodied in many other forms.

We claim:

1. A method for interpreting a user interaction with a document displayed on or by a device operatively associated with a touch screen, said method comprising the steps of:
   (a) detecting a contact of an object on said touch screen;
   (b) determining a parameter indicative of the size or shape of said object;
   (c) performing a comparison between said parameter and a predetermined threshold; and
   (d) utilizing said comparison to associate motion of said object maintaining the contact with and across said touch screen with an action to be performed on said document,
   wherein, when said parameter is greater than or equal to said threshold, said motion is associated with a translation action on said document, and
   wherein, when said parameter is less than said threshold, said motion is associated with an annotation action on said document.

2. A method according to claim 1, wherein said contact is made at an arbitrary location on said touch screen.

3. A method according to claim 2, wherein said translation action is a page turn when said motion is a substantially horizontal swipe.

4. A method according to claim 1, wherein said annotation action comprises electronic inking on said document.

5. A method according to claim 1, wherein said annotation comprises highlighting text in said document when a contact of a second object is detected in a predetermined portion of said touch screen.

6. A method according to claim 1, wherein said motion is associated with an erasure action of annotation on said document when said parameter is greater than or equal to said threshold, and when a contact of a second object is detected in a predetermined portion of said touch screen.

7. A method according to claim 5, wherein said predetermined portion comprises areas proximate to one or more corners of said touch screen.

8. A method according to claim 5, wherein a parameter indicative of the size of said second object is required to be greater than or equal to said threshold.

9. A method according to claim 8, wherein said threshold is chosen to distinguish between contact of a finger or thumb on said touch screen and contact of a stylus on said touch screen.

10. A method according to claim 9, wherein said device is an electronic reader.

11. A method according to claim 10, wherein said touch screen does not include any layers in front of the display surface of said electronic reader with refractive index substantially different from the refractive index of the front layer of said display.

12. A method according to claim 11 wherein said touch screen is an infrared touch screen.

13. A method for facilitating user interaction with a document using a touch-sensitive device, said method comprising the steps of:
   (a) determining a size or shape parameter of a touch object in contact with said touch-sensitive device;
   (b) performing a comparison between said parameter and a series of value ranges associated with a respective a series of protocols to manipulate said document; and
   (c) utilizing said comparison to initiate at least one of said respective protocols upon motion of said touch object which maintains the contact with said touch-sensitive device,
   wherein, when said parameter is within a first of the value ranges, said motion is associated with a translation action on said document, and
   wherein, when said parameter is within a second of the value ranges, said motion is associated with an annotation action on said document.

14. A touch-sensitive device comprising:
   a display;
   a touch screen operatively associated with said display;
   a detector for detecting contact of an object on said touch screen and for tracking motion of said object across said touch screen;
   a processor for determining a parameter indicative of the size or shape of said object, for performing a comparison between said parameter and a predetermined threshold, and for utilizing said comparison to associate motion of said object maintaining the contact with and across said touch screen with an action to be performed on a document displayed on or by said display,
   wherein, when said parameter is greater than or equal to said threshold, said motion is associated with a translation action on said document, and
   wherein, when said parameter is less than said threshold, said motion is associated with an annotation action on said document.

15. A touch-sensitive device according to claim 14, wherein said display is a reflective display integrated with said touch screen.

16. A touch-sensitive device according to claim 15, wherein said touch screen does not include any layers in front of the display surface of said reflective display with refractive index substantially different from the refractive index of the front layer of said display.

17. A touch-sensitive device according to claim 14, wherein said touch screen is an infrared touch screen.

18. An article of manufacture comprising a non-transitory computer readable medium having a computer readable program code configured to conduct the method of claim 1.

19. An article of manufacture comprising a non-transitory computer readable medium having a computer readable program code configured to conduct the method of claim 13.

20. An article of manufacture comprising a non-transitory computer readable medium having a computer readable program code configured to operate the system of claim 14.

* * * * *